United States Patent
Nakajima et al.

(10) Patent No.: US 7,207,723 B2
(45) Date of Patent: *Apr. 24, 2007

(54) WHEEL SUPPORT BEARING ASSEMBLY WITH MAGNETIC ENCODER

(75) Inventors: Tatsuo Nakajima, Iwata (JP); Kouya Oohira, Iwata (JP); Arito Matsui, Iwata (JP); Kazutoyo Murakami, Iwata (JP)

(73) Assignee: NTN Corporation, Osaka (JP)

( * ) Notice: Subject to any disclaimer, the term of this patent is extended or adjusted under 35 U.S.C. 154(b) by 219 days.

This patent is subject to a terminal disclaimer.

(21) Appl. No.: 10/793,875

(22) Filed: Mar. 8, 2004

(65) Prior Publication Data

US 2004/0179760 A1    Sep. 16, 2004

(30) Foreign Application Priority Data

Mar. 11, 2003  (JP) .............................. 2003-064951

(51) Int. Cl.
*F16C 19/28*   (2006.01)

(52) U.S. Cl. ..................................... 384/448
(58) Field of Classification Search ................ 384/477, 384/484, 485, 486, 448

See application file for complete search history.

(56) References Cited

U.S. PATENT DOCUMENTS

| | | | |
|---|---|---|---|
| 4,043,620 A | 8/1977 | Otto | |
| 5,431,413 A | 7/1995 | Hajzler | |
| 6,003,871 A | 12/1999 | Poll | |
| 6,637,754 B1 * | 10/2003 | Ohtsuki et al. | 384/448 |
| 6,692,153 B2 * | 2/2004 | Ohtsuki et al. | 384/448 |
| 6,776,420 B2 * | 8/2004 | Vignotto et al. | 384/448 |
| 6,789,948 B2 * | 9/2004 | Nakajima | 384/448 |
| 2002/0126926 A1 | 9/2002 | Ohtsuki et al. | |

FOREIGN PATENT DOCUMENTS

| | | |
|---|---|---|
| EP | 0 992 797 A1 | 4/2000 |
| JP | 2816783 | 8/1998 |
| JP | 2004-37441 | 2/2004 |

OTHER PUBLICATIONS

Patent Abstracts of Japan, Mizuta Hideo, "Bearing Seal Having Rotation Detecting Device", Publication No. 05-238369, Publication Date: Sep. 17, 1993.

Patent Abstracts of Japan, Hajzler Christian, "Sealing Structure Incorporating Encoder", Publication No. 06-281018, Publication Date: Oct. 7, 1994.

* cited by examiner

*Primary Examiner*—Thomas R. Hannon

(57) ABSTRACT

To provide a wheel support bearing assembly capable of securing a satisfactory sealability and of accomplishing an assured press-fit of an magnetic encoder, the wheel support bearing assembly for supporting a vehicle wheel rotatably relative to a vehicle body structure includes an outer member 2, an inner member 1 positioned inside the outer member 2 with an annular bearing space delimited between it and the outer member 2, and rows of rolling elements 3 rollingly within the annular bearing space. At least one sealing unit 5 is provided for sealing one of opposite open ends of the annular bearing space. This sealing unit 5 is comprised in part of a magnetic encoder 10 including a multi-pole magnet member 14 having a plurality of opposite magnetic poles alternating in a direction circumferentially thereof and a first sealing plate 11 serving as a core metal. The first sealing plate 11 is press-fitted onto the inner member 1 with the amount of interference fit to be within the range of 5 to 230 μm.

7 Claims, 10 Drawing Sheets

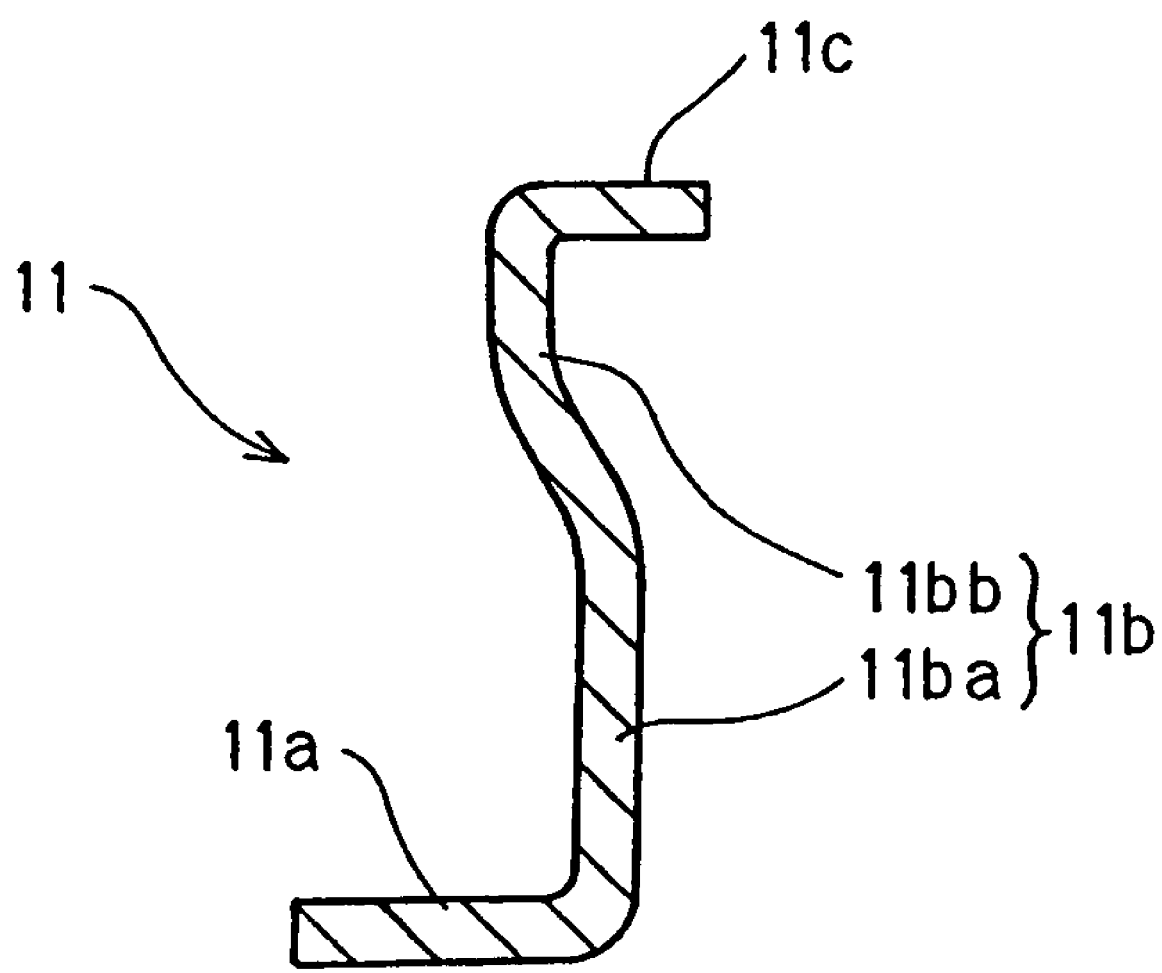

WHEEL SUPPORT BEARING ASSEMBLY WITH MAGNETIC ENCODER

BACKGROUND OF THE INVENTION

1. Field of the Invention

The present invention generally relates to a wheel support bearing assembly equipped with a magnetic encoder for detecting the number of revolutions of a vehicle wheel as a component part of an anti-skid brake system or the like. Particularly, the present invention relates to the wheel support bearing assembly of a kind wherein the magnetic encoder is employed as a component part of a bearing sealing device.

2. Description of the Prior Art

The conventional rotation detecting device for use in association with an anti-skid brake system for minimizing the hazard of an automotive vehicle being skidded includes, in general, a serrated rotor and a detecting sensor, which are arranged spaced a distance from each other by means of a sealing device used to seal a bearing assembly, but are functionally integrated together to define a single and independent rotation detecting device.

This conventional rotation detecting device is of a structure in which the number of revolutions of the serrated rotor mounted on a rotary shaft for rotation together therewith can be detected by the revolution detecting sensor fitted to a knuckle. The bearing assembly incorporating such rotation detecting device is protected by the sealing device, disposed independently and laterally of the rotation detecting device, from an undesirable ingress of foreign matters such as dusts and dirt and/or water.

The Japanese Patent No. 2816783, for example, discloses a bearing seal assembly incorporating therein a rotation detecting device for detecting the number of revolutions of a vehicle wheel. To reduce the space for mounting of the rotation detecting device and to improve the detecting performance thereof, the bearing seal assembly having the rotation detecting device includes an annular slinger and an elastic member admixed with a powdery magnetic material and bonded by vulcanization to the annular slinger, with a plurality of opposite magnetic poles defined so as to alternate circumferentially of the elastic member. The slinger and the magnetized elastic member bonded to the slinger form a magnetic encoder.

The Japanese Laid-open Patent Publication No. 6-281018, for example, discloses a built-in coder sealing structure so designed as to reduce the axial dimension of the sealing structure, to increase the sealability between a rotating element and a stationary element and to render it to be easily mounted. According to this laid-open patent publication, a gap between the rotating element and the stationary element is sealed and a rotary disc is mounted on the rotating element for rotation together therewith. A coder magnetized to have a plurality of opposite magnetic poles is mounted on the rotary disc and built in the sealing structure. This coder is a magnetic encoder made of an elastomer added with a powdery magnetic material and is used as a sealing means in which a side face of the coder is held substantially level with a side face of the stationary element.

The magnetic encoder suggested in any one of the foregoing patent literature is of a structure in which the multi-pole magnet member is mounted on a core metal serving as a slinger which is in turn press-fitted onto a bearing inner race or the like. However, even though in the conventional magnetic encoder of the kind discussed above the firm mounting of the core metal onto the bearing inner race under the interference fit is achieved, there is a high possibility that when the use is made under extremely severe conditions, salty water or the like may enter the bearing assembly through an interface between the core metal and the bearing inner race and will therefore affect the lifetime of the bearing assembly adversely. Because of this, improvement of the sealing performance is demanded to avoid the problem. More specifically, even though the sealing device per se can exhibit a satisfactory sealing performance, the interface between the bearing inner race and the core metal of the magnetic encoder which is a component part of the sealing device is also required to be sealed when the core metal is mounted on the bearing inner race.

Also, if the fitting of the core metal of the magnetic encoder to the bearing inner race is too tight, in other words, the amount of interference fit is too large, a pressing force during the press-fitting of the core metal onto the bearing inner race becomes too large and, therefore, there is a high risk of the core metal being undesirably deformed. Once the core metal is so deformed, a gap is developed between the deformed portion of the core metal and the bearing inner race, causing reduction in sealability.

Although the above magnetic encoder uses a rubber magnet as the multi-pole magnet member, it may also use a multi-pole magnet member prepared from a sintered element in order to increase the sensitivity. In this case, cracking in the magnet member due to the press-fitting of the magnetic encoder onto the bearing inner race has to be taken into consideration.

In the conventional magnetic encoder employing the rubber magnet, the amount of the powdery magnetic material to be used in the rubber magnet cannot be increased and, therefore, increase of the detecting sensitivity is naturally limited. This is because, if the amount of the powdery magnetic material to be mixed is too large during the process of kneading the powdery magnetic material, not only is a kneading machine apt to be damaged considerably, but also the powdery magnetic material tends to be oxidized in contact with heat evolved during the processing with the magnetic characteristic consequently deteriorated. Also, with the magnetic encoder employing the rubber magnet, there is a high possibility that the surface of the magnetic encoder will be damaged or scratched in contact with sand particles or the like that are trapped in between the surface of the magnetic encoder and the magnetic sensor confronting with such magnetic encoder surface.

The same applicant as that of the present invention has therefore suggested a magnetic encoder including a multi-pole magnet member. This multi-pole magnet member is a sintered element prepared by sintering a mixture of a powdery magnetic material and a powdery non-magnetic material. See the Japanese Laid-open Patent Publication No.2004-037441. However, the magnetic encoder having the multi-pole magnet member prepared from the sintered element appears to be damaged by strong impacts.

SUMMARY OF THE INVENTION

In view of the foregoing, the present invention is intended to provide a wheel support bearing assembly of a type capable of securing a high sealability and in which mounting of a magnetic encoder under interference fit can be satisfactorily and assuredly achieved.

Another important object of the present invention is to substantially eliminate any possible damage to a multi-pole magnet member during the press-fitting of the magnetic encoder particularly where the multi-pole magnet member is prepared from a sintered element.

In order to accomplish the foregoing objects of the present invention, the wheel support bearing assembly herein disclosed is for rotatably supporting a vehicle wheel relative to a vehicle body structure and includes an outer member having an inner peripheral surface formed with a plurality of first raceways, an inner member having a corresponding number of second raceways defined therein in alignment with the first raceways in the outer member and being positioned inside the outer member with an annular bearing space delimited between it and the outer member, and rows of rolling elements rollingly received in part within the first raceways and in part within the second raceways. The wheel support bearing assembly also includes at least one sealing unit for sealing one of opposite open ends of the annular bearing space. This at least one sealing unit includes a first sealing plate of a generally L-sectioned configuration mounted on one of the outer and inner members which serves as a rotatable member and having a first axial cylindrical wall and a first radial upright wall protruding radially from the first axial cylindrical wall, and a second sealing plate of a generally L-sectioned configuration positioned in face-to-face relation with the first sealing plate and mounted on the other of the outer and inner members which serves as a stationary member, and having a second axial cylindrical wall and a second radial upright wall protruding radially from the second axial cylindrical wall, and an elastic sealing member including a side sealing lip and at least one radial sealing lip and secured to the second sealing plate with the side sealing lip slidingly engaging the first radial upright wall of the first sealing plate and with the at least one radial sealing lip slidingly engaging the first cylindrical axial wall of the first sealing plate. A magnetic encoder includes a multi-pole magnet member fixedly mounted on the first radial upright wall of the first sealing plate, in which case the first sealing plate cooperates with the multi-pole magnet member to define the magnetic encoder. The first sealing plate is mounted on the rotating member under an interference fit with the amount of interference fit being within the range of 5 to 230 μm.

The term "the amount of interference fit" referred to above is intended to mean the radial overlap dimension between the mating surfaces of the first axial cylindrical wall of the first sealing plate and the rotatable member.

According to the present invention, with the magnetic encoder of the structure discussed above, the number of revolution of one of the inner and outer members that is a rotatable member, for example, the inner member rotatable together with the vehicle wheel, can be detected when a magnetic sensor is disposed in face-to-face relation with the magnetic encoder. Since this magnetic encoder forms a part of the sealing unit for sealing the corresponding open end of the annular bearing space delimited between the inner and outer members, the number of revolutions of the vehicle wheel can be detected with a compact structure and with no need to increase the number of component parts employed. As discussed above, the annular bearing space can effectively be sealed by the generally L-sectioned first sealing plate and the second sealing plate provided with the elastic member having the side sealing lip and the at least one radial sealing lip slidingly engageable with the first radial upright wall and the first axial cylindrical wall of the first sealing plate, respectively. In such case, since the magnetic encoder forms a part of the sealing unit as described above, sealing is required even at the interface between the first sealing plate, serving as a core metal of the magnetic encoder, and such one of the inner and outer members serving as the rotatable member. For this purpose, in accordance with the present invention, the amount of interference fit is chosen to be within the range of 5 to 230 μm and, accordingly, it is possible to firmly secure the magnetic encoder on the rotatable member with high sealability.

If the amount of interference fit is not greater than the lowermost limit of 5 μm, the coherence of the first sealing plate on the rotatable member would be insufficient to such an extent as to fail a satisfactory sealability. Only selection of the lowermost limit of the amount of interference fit not smaller than 5 μm is effective to secure the satisfactory sealability. On the other hand, if the amount of interference fit is greater than the uppermost limit of 230 μm, the first sealing plate would be susceptible to deformation, accompanied by reduction in sealability. Only selection of the uppermost limit of the amount of interference fit not greater than 230 μm is effective to avoid the problem associated with deformation of the first sealing plate to thereby ensure the firm fixing of the magnetic encoder on the rotatable member.

In a preferred embodiment of the present invention, the multi-pole magnet member of the magnetic encoder may be a sintered element prepared by sintering the mixture of a powdery magnetic material and a powdery non-magnetic material.

Although the use of the sintered element will bring about increase in detecting sensitivity and also in productivity of the magnetic encoder of a thin-walled structure, the sintered element is susceptible to damage unless care is taken. In the practice of the present invention, since the amount of interference fit is chosen to be within the range of 5 to 230 μm, the damage problem resulting from deformation of the first sealing plate during the press-fitting of the first sealing plate onto the rotatable member can be avoided. Also, since the multi-pole magnet member is a sintered element prepared by sintering a powdery mixture of the powdery magnetic material and the powdery non-magnetic metallic material, as compared with the sintered element containing only the powdery magnetic material, the sintered element employed in the present invention is robust against damage.

The sintered element containing the sintered mixture of the powdery magnetic material and the powdery non-magnetic metallic material as discussed above can bring about the following advantages and can be utilized to manufacture a wheel support bearing assembly equipped with the compact magnetic encoder that is excellent in various aspects.

(1) As compared with the conventional use of elastomer or plastomer, the amount of the powdery magnetic material to be contained in the multi-pole magnet member can be increased and, for this reason, the magnitude of the magnetic force per unitary volume can be increased to thereby increase the detecting sensitivity and also to enable the multi-pole magnet member to be manufactured having a thin-walled structure.

(2) As compared with the conventional sintered magnet in which solely the powdery magnetic material is sintered, the presence of the powdery non-magnetic metallic material acting as a binder in the multi-pole magnet member of the present invention is effective to minimize damage to the multi-pole magnet member.

(3) Since the multi-pole magnet member can have an increased surface hardness as compared with the conventional one prepared by the use of elastomer or the like, the multi-pole magnet member can have an increased abrasion resistance and is less susceptible to damage. Specifically, when the magnetic encoder forming as a part of the sealing device is exposed to severe conditions such as found on a road surface, it often occurs that particulate matter such as sand particles or the like may be trapped in a gap between the multi-pole magnet member on the rotating side and the magnetic sensor on the stationary side during run of the vehicle. However, since the multi-pole magnet member is a sintered element containing a sintered mixture of the powdery magnetic material and the powdery non-magnetic metallic material, the surface hardness of the multi-pole magnet member is therefore harder than that of the conventional coder such as an elastomer coder and a plastomer coder containing a powdery magnetic material or magnetic particles. Because of this, even though the particulate matter is trapped in between the multi-pole magnet member and the magnetic sensor, undesirable abrasion of and damage to the multi-pole magnet member can advantageously be minimized.

(4) Also, as compared with the elastomer coder, the productivity of the multi-pole magnet member employed in the present invention is advantageously high.

The reasons for those meritorious effects available with the present invention will now be discussed. The powdery magnetic material and the powdery non-magnetic metallic material are mixed in a predetermined mixing ratio by the use of a powder mixer. The resulting powdery mixture is in turn pressure-molded at normal temperatures within a molding assembly to provide a green compact.

At this time, the resultant sintered element containing the powdery non-magnetic metallic material as a binder mixed in the powdery magnetic material can have an increased relative content (volume based percent) of the powdery magnetic material contained in the sintered element by means of a dry blending in which the powdery magnetic material and the non-magnetic metallic materials are dispersed in a powder mixing machine while the mixing ratio thereof is adjusted. Because of this, the magnetic force required to achieve a stabilized sensing capability of the magnetic sensor can easily be obtained and the multi-pole magnet member need not have an increased wall thickness.

Also, even during the manufacture of the sintered element used as the multi-pole magnet member, the method of sintering the powdery mixture prepared by the above dry blending does not require a vulcanizing process as compared with the conventional injection molding method or the conventional compressive molding method for the elastomer or elastic material hitherto practiced and the load imposed during the molding is minimal. Therefore, the manufacturing process for the sintered element employed in the practice of the present invention can advantageously be simplified. In addition, in the case of the molding of the green compact by means of the sintering technique, the problem of abrasion of the mold assembly can advantageously be avoided as compared with the injection molding or compressive molding method hitherto employed for the elastomer or elastic material.

In the practice of the present invention, fixing of the multi-pole magnet member of the magnetic encoder to the first sealing plate can be accomplished by crimping a portion of the first sealing plate. This crimping can be carried out in any one of the following methods.

(1) The first radial upright wall of the first sealing plate of the magnetic encoder is formed with an axially extending cylindrical wall protruding from an outer peripheral edge of the first radial upright wall and the multi-pole magnet member is then fixed to the first sealing plate by crimping of the axially extending cylindrical wall.

(2) The first radial upright wall of the first sealing plate of the magnetic encoder is formed with an axially extending cylindrical wall protruding from an outer peripheral edge of the first radial upright wall and the multi-pole magnet member is then fixed to the first sealing plate by plastically deforming a plurality of circumferential portions of the cylindrical wall generally radially inwardly. This plastically deformed portion may be formed by, for example, a staking technique.

(3) The first radial upright wall of the first sealing plate of the magnetic encoder is formed with a plurality of tongues protruding in a circular row from an outer peripheral edge of the first radial upright wall and the tongues are then plastically deformed or crimped to fix the multi-pole magnet member to the first sealing plate.

The use of the crimping technique discussed above is effective to permit the multi-pole magnet member to withstand against the extreme temperature and severe environments and, hence, the reliable fixture of the multi-pole magnet member of the magnetic encoder to the first sealing plate can be attained. Also, the use of the crimping technique in combination with selection of the amount of interference fit within the range of 5 to 230 μm will not bring about any adverse effects on plastically deformed portions or the crimpled portions, which would be otherwise brought about upon deformation of the first sealing plate.

In particular, where the first radial upright wall of the first sealing plate of the magnetic encoder is formed with an axially extending cylindrical wall protruding from an outer peripheral edge of the first radial upright wall, such as in the practice of the crimping method (1) above, for fixing the multi-pole magnet member to the first sealing plate by the crimping of the cylindrical wall, the first sealing plate can have a simplified shape as mere formation of the axially extending cylindrical wall is sufficient.

On the other hand, where the multi-pole magnet member is fixed to the first sealing plate by plastically deforming a plurality of circumferential portions of the cylindrical wall generally radially inwardly, such as in the practice of the crimping method (2) above, or where the first radial upright wall of the first sealing plate is formed with the tongues that are subsequently plastically deformed to fix the multi-pole magnet member to the first sealing plate, such as in the practice of the crimping method (3), the crimping work can be performed easily and efficiently.

In another preferred embodiment of the present invention, the first radial upright wall of the first sealing plate of the magnetic encoder may include an annular inner portion and an annular outer portion continued from and offset axially from the annular inner portion.

The use of the radial upright wall having the annular inner and outer portions offset axially relative to each other is particularly advantageous in that the multi-pole magnet member can have any desired thickness depending on the application thereof and/or for any purpose of use while one of the opposite surfaces thereof that is to be sensed by the magnetic sensor is held flat. By way of example, that portion of the outer peripheral portion of the multi-pole magnet member that is to be fixed by the first sealing plate may have an increased thickness to ensure a firm fixing and/or, depending on the limitation imposed by one or more peripheral component parts such as sealing elements, the multi-pole magnet member can have an increased thickness at its outer peripheral portion to increase the magnetic force. Even where the first sealing plate is so configured as discussed above, since selection of the amount of interference fit is made within the range of 5 to 230 μm, not only a satisfactory sealability is secured but also a firm fixing of the magnetic encoder is secured.

In a further preferred embodiment of the present invention, the multi-pole magnet member of the magnetic encoder or one of opposite surfaces of the first sealing plate where the multi-pole magnet member is fixedly mounted, or both may be rust-proofed. This rust-proofing treatment may be accomplished by forming a rust-proofed coating made from a highly anti-corrosive clear paint. For the highly anti-corrosive clear paint, a paint of a modified epoxy phenol hardening type, for example, can be suitably employed.

Even though the wheel support bearing assembly is employed under severe environments where the bearing assembly tends to be wetted with, for example, a salty water, the rust-proofing treatment so effected can advantageously minimize generation of rust and avoid an undesirable ingress of rust particles inwardly of the bearing assembly. The paint used as discussed above can also provide an effect as a bonding agent for bonding the first sealing plate and the multi-pole magnet member. Particularly where the multi-pole magnet member is an sintered element, the clear paint can penetrate into pores present in a surface region of the porous sintered element and can therefore be appropriately retained in the surface region by the anchoring effect of a component of the clear paint, wherefore a favorable bondability as the rust preventive coating can be maintained even during the use for a prolonged period of time.

In a still further preferred embodiment of the present invention, the first radial upright wall of the first sealing plate may be formed with a second axial cylindrical wall extending cylindrically from the first radial upright wall, in which case the multi-pole magnet member is mounted on the second axial cylindrical wall instead of being mounted on the first radial upright wall.

When the multi-pole magnet member is so mounted on the second axial cylindrical wall as described above, the magnetic encoder will be a radial type in which the magnetic sensor is positioned spaced radially from the multi-pole magnet member in face-to-face relation. Even in this radial type, i.e., where the multi-pole magnet member is mounted on the second axial cylindrical wall, since the amount of interference fit is selected within the range of 5 to 230 μm, not only a satisfactory sealability is secured but also a firm fixing of the magnetic encoder is secured.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 10 is a sectional view of a portion of a first sealing plate, forming a part of the magnetic encoder of a further modified form;

DETAILED DESCRIPTION OF THE EMBODIMENTS

Figure 1:
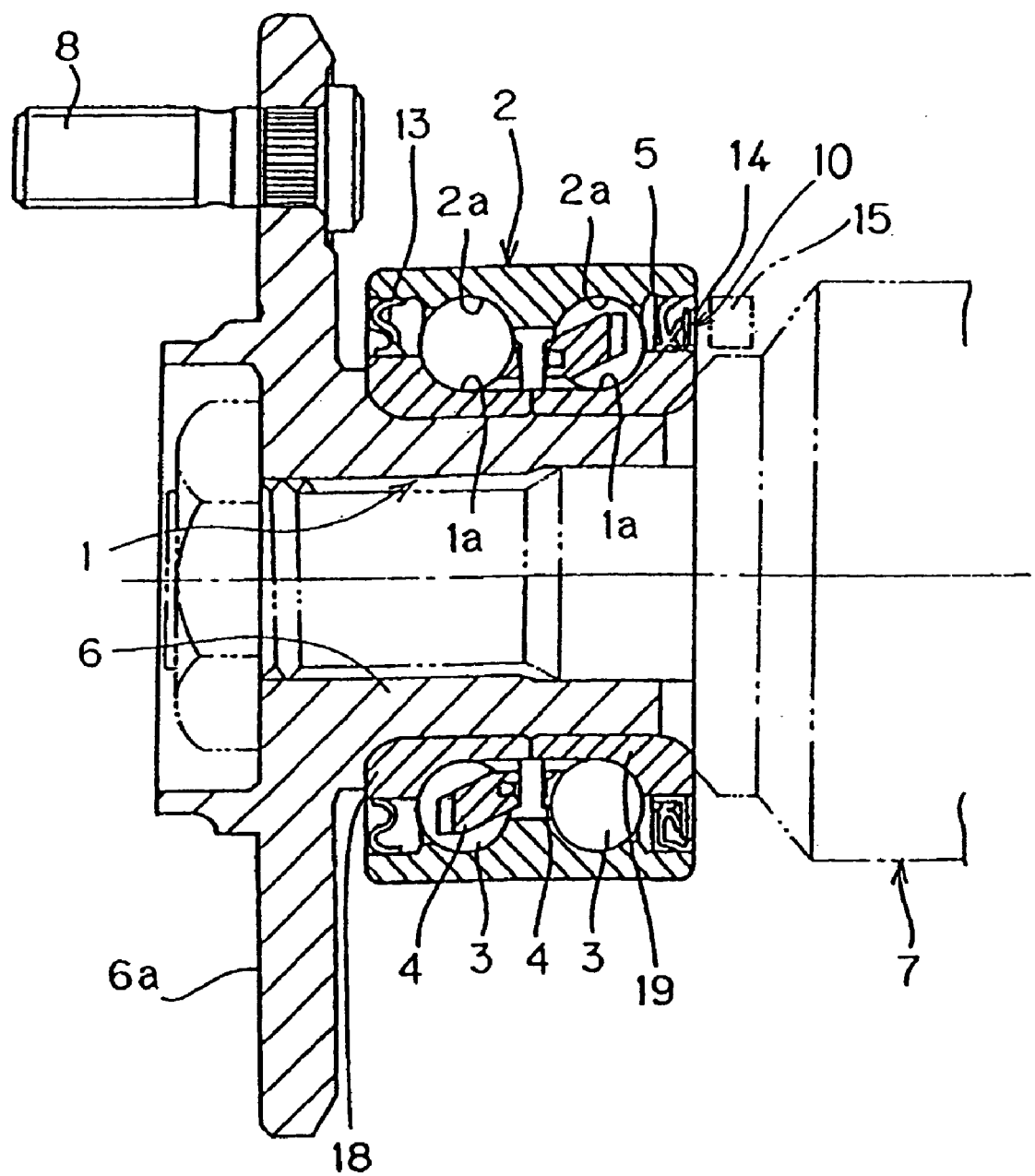
FIG. 1 is a longitudinal sectional view of a wheel support bearing assembly according to a first preferred embodiment of the present invention.

The first preferred embodiment of the present invention will now, be described with particular reference to FIGS. 1 to 6. The wheel support bearing assembly includes an inner member 1, an outer member 2 positioned outside the inner member 1 with an annular bearing space defined between it and the inner member 1, a plurality of, for example, two, rows of rolling elements 3 positioned rollingly within the annular bearing space, and inboard and outboard sealing units 5 and 13 for sealing opposite open ends of the annular bearing space. One of the sealing units, the inboard sealing unit 5 incorporates a magnetic encoder 10 therein in a manner as will be described in detail subsequently.

Specifically, the inner member 1 has its outer peripheral surface formed with inboard and outboard raceways 1a each in the form of a groove, one for each row of the rolling elements 3, and similarly, the outer member 2 has its inner peripheral surface formed with inboard and outboard raceways 2a each in the form of a groove, one for each row of the rolling elements 3 and aligned radially with the corresponding raceway groove 1a in the inner member 1. The rolling elements 3 of each row are received movably in part within the respective raceway groove 1a in the inner member 1 and movably in part within the corresponding raceway groove 2a in the outer member 2.

It is to be noted that the inner and outer members 1 and 2 are respective members rotatable relative to each other through the rows of the rolling elements 3 and positioned radially inwardly and outwardly of the rows of the rolling elements 3, respectively. In terms of the bearing assembly, the inner member 1 and the outer member 2 may be a bearing inner race and a bearing outer race, respectively. Also, each of the inner and outer members 1 and 2 may be either a single integral element or a combination or assembly of a bearing race member and a separate member. Depending on the application in which the wheel support bearing assembly of the present invention is used, the inner member 1 may be a shaft. Rolling elements 3 of the respective row may be either a tapered roller or a ball, although in the illustrated embodiment it is shown as employed in the form of a ball. The rolling elements 3 in each row are retained by a retainer or cage.

The wheel support bearing assembly of the structure discussed above is a double row rolling bearing, more specifically a double row angular (contact) ball bearing and is known as a first generation wheel support bearing assembly. The bearing inner race is comprised of split, outboard and inboard race segments 18 and 19 where the outboard and inboard raceway grooves 1a and 1a referred to above are defined, respectively. The outboard and inboard inner race segments 18 and 19 are fixedly mounted on an outer periphery of an axle of a hub wheel 6 to form the inner member 1. The hub wheel 6 has a wheel fitting flange 6a extending radially outwardly from an outboard end of its axle and is drivingly coupled with one end (for example, a joint outer race) of a constant velocity universal joint 7 for rotation together therewith. A vehicle wheel (not shown) is fitted to the wheel fitting flange 6a by means of a plurality of bolts 8. The opposite end (for example, a joint inner race) of the constant velocity universal joint 7 is drivingly coupled with a drive shaft (not shown). The outer member 2 is comprised of a bearing outer race that is fixedly secured to a housing (not shown) such as a knuckle of a vehicle wheel suspension system.

Figure 4:
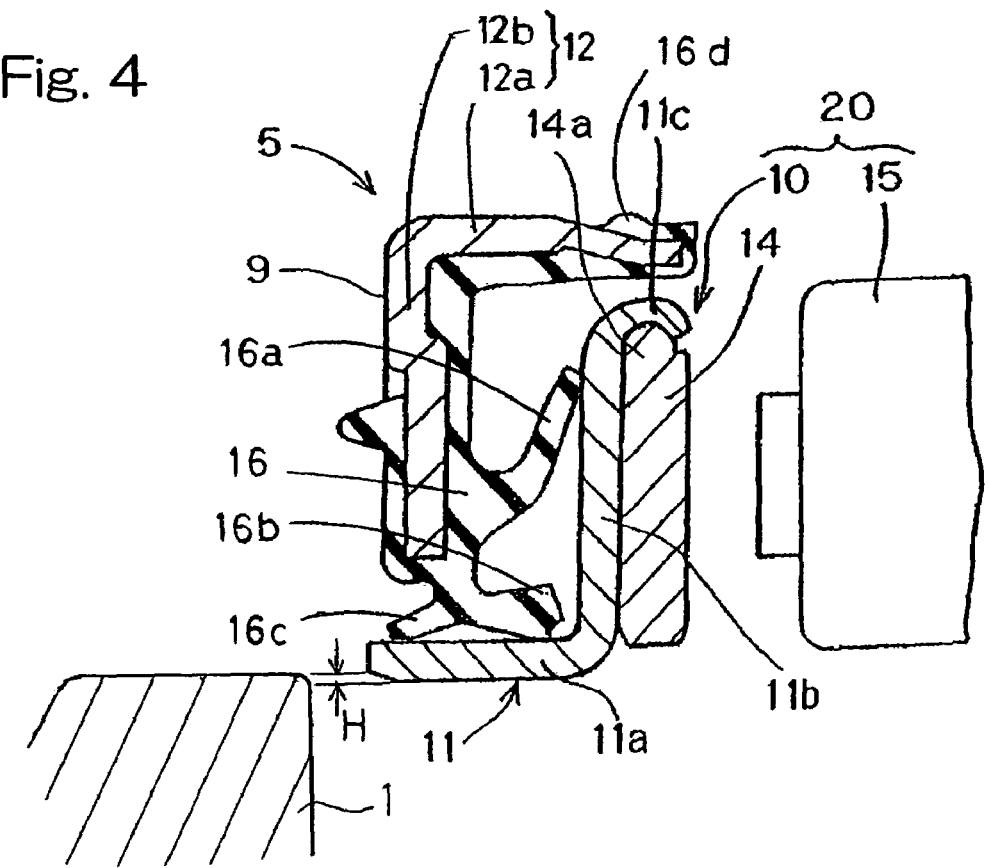
FIG. 4 is a fragmentary longitudinal sectional view showing a sealing unit, equipped with the magnetic encoder, together with a magnetic sensor cooperable with the magnetic encoder.
Figure 5:
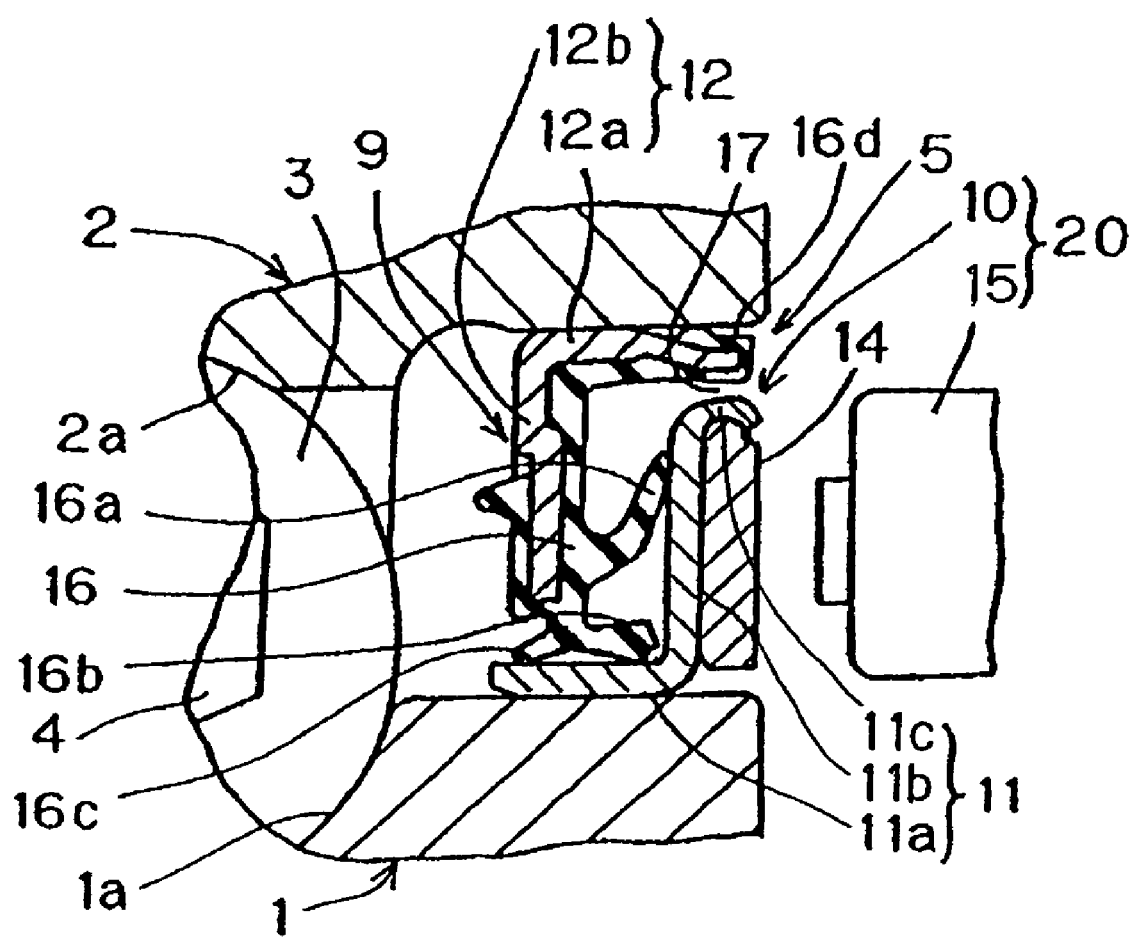
FIG. 5 is a fragmentary longitudinal sectional view of the sealing unit shown together with its surroundings.

Referring now to FIGS. 4 and 5, the details of the inboard sealing unit 5 incorporating the magnetic encoder 10 therein are shown on an enlarged scale. The inboard sealing unit 5 includes the magnetic encoder 10 and a sealing member 9. The magnetic encoder 10 is mounted on one of the inner and outer members 1 and 2 that is rotatable while the sealing member 9 is mounted on the other of the inner and outer members 1 and 2 that is stationary. Hence, since in the illustrated embodiment the inner member 1 is rotatable relative to the outer member 2, the magnetic encoder 10 is mounted on the inner member 1 while the sealing member 9 is fixed to the outer member 2.

Figure 3:
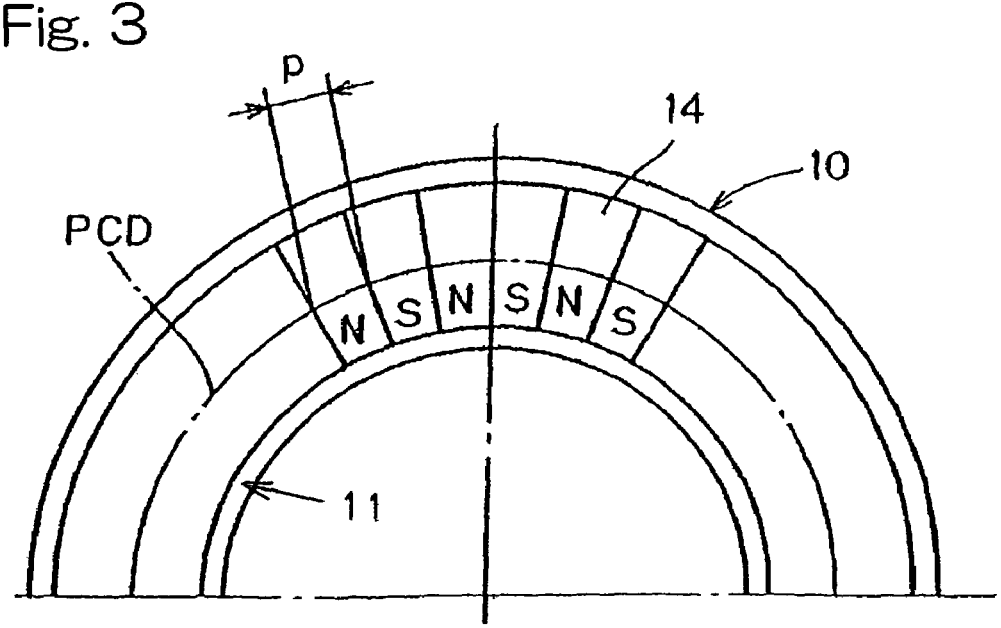
FIG. 3 is an explanatory diagram showing a half of the contour of the magnetic encoder as viewed from front.

The magnetic encoder 10 includes a first sealing plate 11 serving as a first core metal and also concurrently serving as a slinger, and a multi-pole magnet member 14 secured to the first sealing plate 11. On the other hand, the sealing member 9 includes a second sealing plate 12 serving as a second core metal and an elastic member 16 having a plurality of sealing lips 16a to 16c. As best shown in FIG. 3, the multi-pole magnet member 14 is a magnetic disc magnetized to have a plurality of alternating magnetic poles N and S in a direction circumferentially thereof. The neighboring magnetic poles N and S alternate at intervals of a predetermined pitch p along the pitch circle diameter PCD. This magnetic encoder 10 is, as shown in FIG. 4, cooperable with a magnetic sensor 15, disposed in face-to-race relation with the multi-pole magnet member 14, to form a rotation detecting device 20 for detecting the number of revolutions of the hub wheel 6 and, hence, the vehicle wheel.

Figure 2A:
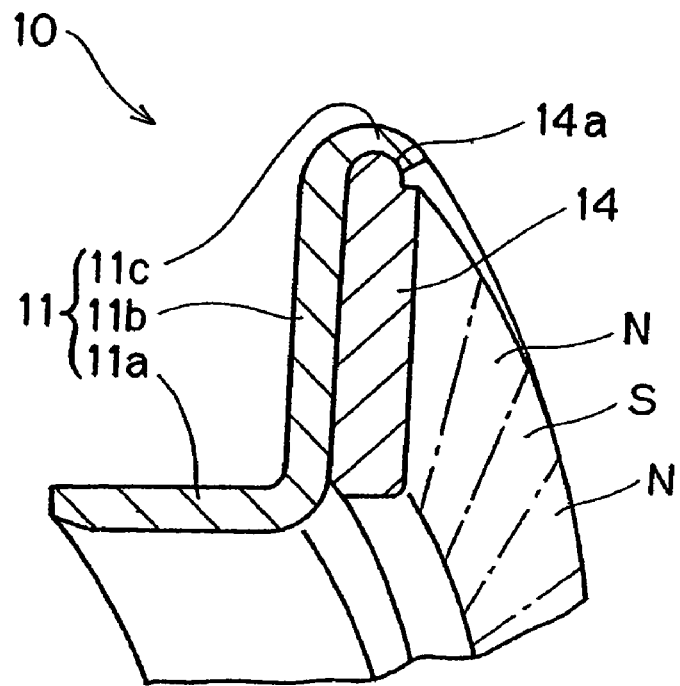
FIG. 2A is a fragmentary perspective view of a magnetic encoder employed in the wheel support bearing assembly.
Figure 2B:
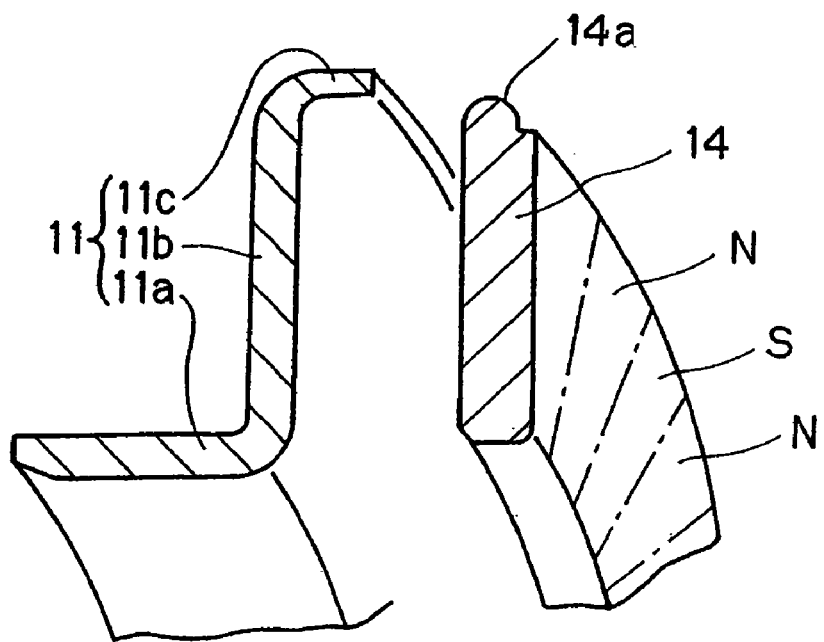
FIG. 2B is a fragmentary perspective view of the magnetic encoder showing a manner of assemblage.

The first sealing plate 11 is of a generally L-sectioned annular configuration including, as best shown in FIG. 2B, an axially extending cylindrical wall 1a to be fixed on the inner member 1, particularly on the inboard inner race segment 19 (FIG. 1), and a radial upright wall 11b protruding radially outwardly from one end of the axial cylindrical wall 11a adjacent the magnetic sensor 15. The radial upright wall 11b has an outer peripheral edge formed integrally with a cylindrical crimping wall or flange 11c protruding generally in a direction counter to the axial cylindrical wall 11a as best shown in FIG. 2B, the function of the cylindrical crimping flange 11c being described in detail later. In any event, when the presence of the cylindrical crimping flange 11c is taken into consideration, the first sealing plate 11 as a whole can be considered having a generally Z-sectioned annular configuration.

This first sealing plate 11 is prepared from a metal plate such as a steel plate by the use of any known press work. The radial upright wall 11b is so shaped in an annular flat configuration that a correspondingly annular sintered element, which has not yet been magnetized and will eventually form the multi-pole magnet member 14, can be fixedly fitted thereto in axially aligned fashion therewith. Specifically, the annular sintered element as will be described later is, after having been held in contact with the radial upright wall 11b, secured irremovably to the radial upright wall 11b with the cylindrical crimping flange 11c crimped radially inwardly to hold, as best shown in FIG. 2A, an entire outer peripheral edge portion of the annular sintered element in position which, when magnetized, forms the multi-pole magnet member 14. It is to be noted that the cylindrical crimping flange 11c defines a crimp region. It is also to be noted that the outer peripheral edge portion of the annular multi-pole magnet member 14 that is clamped by the cylindrical crimping flange 11c is inwardly depressed as at 14a so that a circumferential free edge of the crimpling flange 11c will not protrude inwardly beyond the plane of one surface (i.e., a to-be-detected surface) of the multi-pole magnet member 14 opposite to the radial upright wall 11b and confronting the magnetic sensor 15.

The first sealing plate 11 is mounted on the inner member 1 with the axial cylindrical wall 11a press-fitted or shrink-fitted onto the outer peripheral surface of the inner member 1 under the interference fit. For this interference fit, the inner diameter of the axial cylindrical wall 11a of the first sealing plate 11 is so undersized relative to the outer diameter of the inner member 1, or the outer diameter of the inner member 1 is so oversized relative to the inner diameter of the axial cylindrical wall 11a of the first sealing plate 11, thereby having the amount H of interference fit preferably within the range of 5 to 230 µm and more preferably within the range of 50 to 120 µm as to ensure a firm interference fit between the axial cylindrical wall 11a and the inner member 1

Referring again to FIGS. 4 and 5, the second sealing plate 12 is of a generally L-sectioned annular configuration including an axially extending cylindrical wall 12a and a radial upright wall 12b protruding radially inwardly from one end of the axial cylindrical wall 12a on one side of the radial upright wall 12b remote from the magnetic sensor 15. The second sealing plate 12 is fixed inside the outer member 2 under, for example, an interference fit, i.e., mounted on the outer member 2 with the axial cylindrical wall 12a press-fitted onto the inner peripheral surface of the outer member 2. This second sealing plate has the elastic member 16 firmly bonded by vulcanization thereto. The elastic member 16 is made up of a side sealing lip 16a slidingly engageable with the radial upright wall 11b of the first sealing plate 11 and first and second radial sealing lips 16b and 16c slidably engageable with the axial cylindrical wall 11a of the first sealing plate 11. It is to be noted that the number of the sealing lips may not be limited to that described above and may be an arbitrarily chosen, but the elastic member 16 shown in connection with the preferred embodiment makes use of the single side sealing lip 16a and the two radial sealing lips 16b and 16c.

The elastic member 16 has a generally U-sectioned back-turned cover-up segment 16d formed integrally therewith for receiving therein and covering a free end portion of the axial cylindrical wall 12a of the second sealing plate 12 remote from the radial upright wall 12b. A portion of this back-turned cover-up segment 16d positioned radially outwardly of that free end portion of the axial cylindrical wall 12a intervenes and is hence sandwiched between the second sealing plate 12 and the outer member 2 to thereby increase the sealability of the otherwise formed gap between the second sealing plate 12 and the outer member 2. The axial cylindrical wall 12a of the second sealing plate 12 and the cylindrical crimping flange 11c of the core metal 11, i.e., the first sealing plate 11 are radially spaced a slight distance to define a labyrinth seal 17 although in FIGS. 4 and 5 the gap between the axial cylindrical wall 12a and the cylindrical crimping flange 11c is shown as exaggerated in size.

The first sealing plate 11 is preferably made of a metallic material, particularly a magnetic metal such as a ferromagnetic metal and may therefore be prepared from a steel plate of a kind having a magnetic property and also having a rustproof property. Examples of such steel plate include a ferrite stainless steel plate (identified by SUS 430 according to the JIS, the Japanese Industrial Standards) and a rolled and rustproofed steel plate. On the other hand, the second sealing plate 12 is preferably made of a non-magnetic metallic material and may therefore be prepared from, for example, a non-magnetic stainless steel plate or the like.

The multi-pole magnet member 14 is prepared from the sintered element that is prepared by mixing a powdery magnetic material and a powdery non-magnetic metallic material and subsequently sintering the resultant mixture. The powdery magnetic material mixed in the resultant multi-pole magnet member 14 may be an isotropic or anisotropic ferrite powder of barium or strontium. The ferrite powder may be in the form of a mass of granules or a mass of finely divided particles of wet-type anisotropic ferrite core. Where the mass of finely divided particles of wet-type anisotropic ferrite core is employed as a magnetic material to be mixed in the multi-pole magnet member 14, the mixture of the powdery magnetic material and the powdery non-magnetic metallic material must be prepared in the form of an anisotropic green compact that is formed in the magnetic field.

The powdery magnetic material may be a rare earth magnetic material. By way of example, a magnetic powder of samarium iron (SmFeN) or a magnetic powder of neodymium iron (NdFeB), both of which are a rare earth magnetic material, may be suitably employed. Alternatively, the powdery magnetic material may be a gas atomized powder of manganese-aluminum (MnAl).

Alternatively, the powdery magnetic material may be a mixture of two or more magnetic material. By way of example, the powdery magnetic material may contain a mixture of two or more of a powdery magnetic mass of samarium iron (SmFeN), a powdery magnetic mass of neodymium iron (NdFeB) and a gas atomized powder of manganese aluminum (MnAl). More specifically, a mixture of the magnetic mass of samarium iron (SmFeN) with the magnetic mass of neodymium iron (NdFeB), a mixture of the gas atomized powder of manganese aluminum (MnAl) with the magnetic mass of samarium iron, or a mixture of the magnetic mass of samarium iron, the magnetic mass of neodymium iron and the gas atomized powder of manganese aluminum can be suitably used as the powdery magnetic material to be contained in the multi-pole magnet 14.

It is to be noted that where the use of the ferrite would not result in generation of a sufficient quantity of the magnetic force, a required amount of the rare earth magnetic material such as the powdery magnetic mass of samarium iron (SmFeN) and/or the powdery magnetic mass of neodymium iron (NdFeB) may be added to the powdery ferrite to eventually enable the multi-pole magnet 14 to generate a sufficient magnetic force and also to enable the multi-pole magnet 14 to be manufactured inexpensively.

The non-magnetic metallic material used as another material to be used in the preparation of the multi-pole magnet 14 may be one or a mixture of a powdery tin, a powdery copper, a powdery aluminum, a powdery nickel, a powdery zinc, a powdery tungsten, a powdery manganese, a powdery non-magnetic metallic material such as a powdery non-magnetic stainless steel. An alloyed mixture of two or more of those non-magnetic metallic materials may also be employed in the practice of the present invention.

Each of the powdery magnetic material and the powdery non-magnetic metallic material has an average particle size within the range of 10 to 230 µm and, more preferably, within the range of 20 to 150 µm. If the average particle size of one or both of those powdery magnetic and non-magnetic metallic materials is not greater than 10 µm, it may often occur that the powdery mixture of them will fail to flow smoothly within a mold assembly during an attempt to prepare the green compact by compressing the powdery mixture within the mold assembly under normal temperatures. Once this occur, the green compact of a predetermined or required shape will not be obtained. On the other hand, if the average particle size of one or both of those powdery magnetic and non-magnetic metallic materials is not smaller than 230 µm, preparation of the green compact by compressing the powdery mixture within the mold assembly under normal temperatures will fail. Since the resultant green compact will fail to have a sufficient strength, the resultant green compact cannot be removed out of the mold assembly without being collapsed and cannot therefore be shaped.

As discussed above, only when the powdery magnetic and non-magnetic metallic materials of the predetermined respective average particle sizes are mixed together in a predetermined mixing ratio by the use of a powder mixer and the resultant powdery mixture is subsequently molded within the mold assembly under normal temperatures, the green compact can be obtained satisfactorily.

In the preparation of the powdery mixture used to form the multi-pole magnet member 14, the amount of the powdery non-magnetic metallic material, which is not a powdery magnetic material, is within the range of 1 to 90 vol. %, preferably within the range of 5 to 85 vol. % and, more preferably, within the range of 10 to 80 vol. % relative to the total volume of the multi-pole magnet member 14. If the amount of the powdery non-magnetic metallic material, which is not a powdery magnetic material, is not greater than 1 vol. %, the multi-pole magnet member 14 obtained after sintering will be tough, but fragile since the amount of the non-magnetic metallic material that acts as a metallic binder is insufficient. For this reason, as will be described later, the green compact or the multi-pole magnet member 14 when attempted to be mechanically fixed to the core metal 11 by means of a crimping technique or a press-fitting technique tends to crack or break up. Also, it may occur that the insufficient amount of the powdery non-magnetic metallic material that acts as a metallic binder tends to result in incapability of the green compact being molded.

On the other hand, if the amount of the powdery non-magnetic metallic material, which is not a powdery magnetic material, is not smaller than 90 vol. %, it means that the relative content of the magnetic component is insufficient and, therefore, the multi-pole magnet member 14 obtained after sintering will be incapable of being strongly magnetized to such an extent as to secure the magnetic force required to ensure a stabilized sensing capability that is required in the magnetic encoder 10.

In the preparation of the green compact, a lubricant agent such as zinc stearate may be added during the mixing of the powdery magnetic and non-magnetic metallic materials to thereby improve the moldability of the green compact.

The compressed powdery element (green compact) has a porosity within the range of 5 to 30 vol. %, preferably within the range of 12 to 22 vol. % and, more preferably, within the range of 14 to 19 vol. %. If the porosity of the green compact is not greater than the lowermost limit of 5 vol. %, the possibility would arise that the green compact being prepared will rupture by the effect of the spring back which, when the molding pressure is relieved, would occur upon restoration from its compressed state of the mixture of the powdery magnetic and non-magnetic metallic materials to the initial state. On the other hand, if the porosity of the green compact is not smaller than the uppermost limit of 30 vol. %, the sintered element which is subsequently prepared from the green compact will exhibit an insufficient mechanical strength and, therefore, as will be detailed later, the sintered element will break when the sintered element is to be fixed to the core metal 11 by the use of a crimping or press-fitting technique. Also, the excessive porosity exceeding the uppermost limit will also result in insufficient bonding between particles and it may therefore occur that the compressed powdery element (green compact) may not be prepared sufficiently.

Considering that the powdery magnetic material and the powdery non-magnetic metallic material are expensive, the green compact preferably has a relatively small plate thickness. Specifically, the plate thickness of the green compact is preferably within the range of 0.3 to 5 mm and, more preferably, within the range of 0.6 to 3 mm in terms of compressive moldability and the handling capability. If the plate thickness is not greater than the lowermost limit of 0.3 mm, not only would it be difficult to fill the mixture of the powdery magnetic and non-magnetic metallic material into the mold assembly and the green compact would not be easily obtained, but also the green compact will be susceptible to breakage during handling. On the other hand, if the green compact has a plate thickness not smaller than the uppermost limit of 10 mm, a disadvantage would arise in terms of cost even though the moldability and the handling capability increase. In addition, the excessive plate thickness exceeding the uppermost limit tends to render the resultant green compact to have an irregular density to such an extent that when the green compact is subsequently sintered, it will be susceptible to deformation. By the reasons discussed above, the green compact preferably has a plate thickness within the range of 0.3 to 5 mm.

Figure 6:
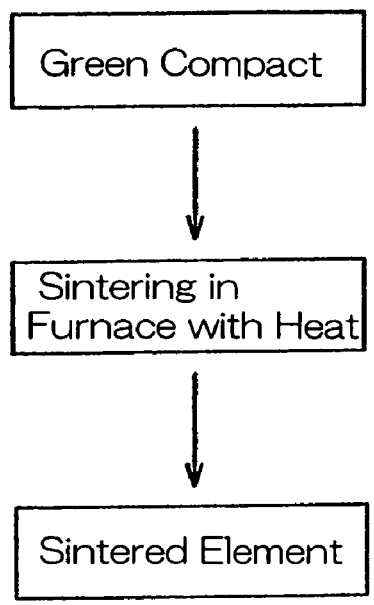
FIG. 6 is a flowchart showing the process of sintering a green compact to form a sintered element.

The green compact so obtained is sintered within a furnace to provide the sintered element of the disc shape as shown in FIG. 6. The heat treatment to sinter the green compact within the furnace may be carried out under the atmosphere, in an electric heating furnace or a vacuum furnace, or in an inert furnace or pusher furnace with an inert gas flowing thereinto.

Figure 7:
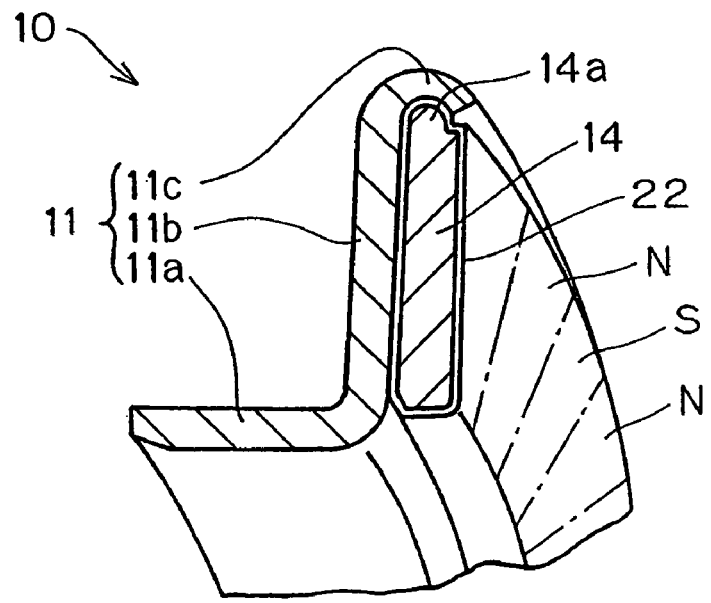
FIG. 7 is a fragmentary perspective view showing a modified form of the magnetic encoder employed in the wheel support bearing assembly.

The sintered element used to form the magnetic encoder 10 may be treated to have a rust preventive coating 22, as shown in FIG. 7. This rust preventive coating 22 is, in other words, an anti-corrosion coating and may be formed by the use of a high anti-corrosion clear paint. The clear paint can be expected to bring about an effect as a bonding agent for bonding the core metal and the sintered element together and, when penetrating into pores in a surface region of the porous sintered element, the clear paint can be appropriately retained in the surface region by the anchoring effect of a component of the clear paint and, therefore, a favorable bondability as the rust preventive coating can be maintained even during the use for a prolonged period of time.

With the wheel support bearing assembly of the structure hereinabove described, rotation of the inner member 1 together with the vehicle wheel can be detected by the magnetic sensor 15 through the magnetic encoder 10 that is mounted on the inner member 1 for rotation together therewith, which magnetic sensor 15 subsequently outputs an electric signal indicative of the number of revolutions of the vehicle wheel. Specifically, when the magnetic encoder 10 is rotated, passage of the opposite magnetic poles N and S of the multi-pole magnet member 14 can be detected by the magnetic sensor 15 which detects the rotation in the form of a train of pulse, the number of which pulse corresponds to the number of revolutions of the magnetic encoder 10. Since the pitch p (FIG. 3) of the poles N and S can be defined to a small value if so desired. For example, if the pitch p is chosen to be 1.5 mm, the precision of ±3% of the single pitch deviation can be achieved, thus allowing detection of the rotation with a high accuracy. The single pitch deviation is represented by the difference in distance between the magnetic poles detected at a position spaced a predetermined distance from the magnetic encoder 10, which is expressed by the ratio relative to a target pitch.

In the wheel support bearing assembly, since the magnetic encoder 10 is employed as a part of the sealing unit 5, the number of revolution of the vehicle wheel can be detected without increasing the component parts. With respect to the sealing between the inner and outer members 1 and 2, it can be achieved by the sliding contact of the elastic sealing lips 16a to 16c of the elastic member 16 of the second sealing plate 12 and the labyrinth seal 17 defined by the slight gap present between the axial cylindrical wall 12a of the second sealing plate 12 and the cylindrical crimping flange 11c of the core metal 11 that is the first sealing plate 11.

Although sealing is required at the interface between the first sealing plate 11 and the inner member 1, this can be achieved as a result that the particular interference amount H (5 to 230 μm) between the first sealing plate 11 and the inner member 1 is so defined as to press-fit the first sealing plate 11 on the inner member 1. In other words, as will be subsequently demonstrated by way of Examples, if the interference amount H is not greater than the lowermost limit of 5 μm, the intimacy between the first sealing plate and the rotatable member will be insufficient, failing to achieve a sufficient sealing. However, selection of the interference amount H not smaller than the lowermost limit of 5 μm is effective to secure the sufficient sealing. On the other hand, if the interference amount H is not smaller than the uppermost limit of 230 μm, the first sealing plate 11 will result in deformation, accompanied by reduction in sealability. However, selection of the interference amount H not greater than the uppermost limit of 230 μm is effective to ensure a firm fixing of the magnetic encoder 10 without allowing the first sealing plate 11 to be deformed. Although the multi-pole magnet member 14 of the magnetic encoder 10 has been described as prepared from the sintered element, selection of the particular interference amount H within the range of 5 to 230 μm would pose no problem associated with damages to the multi-pole magnet member 14, which would otherwise result from deformation of the first sealing plate 11 during the press-fitting of the first sealing plate 11 onto the first member 1.

Also, although the multi-pole magnet member 14 is prepared from the sintered element, the sintered element so used does not consist solely of a powdery magnetic material, but of a mixture of a powdery magnetic material and powdery non-magnetic material (a so-called "magnetic powder blended and sintered disc"). Accordingly, as will be demonstrated later, not only can the multi-pole magnet member 14 be manufactured having a thin-walled feature while securing a sufficient magnetic force required to achieve a stabilized sensing function, but also the magnetic encoder 10 as a whole can be assembled compact in size and having an excellent abrasion resistance and also a high productivity.

Specifically, in the magnetic powder blended and sintered magnet member of a disc shape (sintered element) of a composition in which the powdery magnetic material is blended with the powdery non-magnetic metallic material used as a binder, a dry blend of powdery particles can be obtained by dispersing the powdery magnetic material and the non-magnetic metallic materials within a powder mixing machine while the mixing ratio thereof are adjusted. For this reason, the relative content (volume based percent) of the powdery magnetic material contained in the sintered element can be increased. The increased amount of the powdery magnetic material allows the multi-pole magnet member 14 to provide an magnetic force required for the magnetic sensor 15 (FIG. 4) to achieve a stabilized sensing, with no need to render the multi-pole magnet member 14 to have an increased plate thickness. It is to be noted that while the space available at a bearing end of the wheel support bearing assembly is limited because of the presence of the constant velocity universal joint 7 and a bearing support member (not shown), the rotation detecting device 20 can be easily installed because the multi-pole magnet member 14 of the magnetic encoder 10 can be manufactured having a thin-walled structure. Also, the multi-pole magnet member 14 has a surface hardness higher than that of the conventional coder made of an elastomer or an elastic material containing a powdery magnetic material or particles. Because of this, if the multi-pole magnet member 14 is employed in the rotation detecting device 20 for detecting the number of revolutions of the vehicle wheel, frictional wear and damage would hardly occur even though sand particles are trapped into a space delimited between the surface of the multi-pole magnet member 14 and the mating surface of the magnetic sensor 15 during run of the automotive vehicle and, therefore, as compared with that made of the elastic material, the extent to which the frictional wear occurs can be reduced considerably.

One of the annular opposite surfaces of the magnetic powder blended and sintered magnet member of the disc shape which eventually forms the multi-pole magnet member 14 that is secured to the core metal 11, which is an annular metallic member, so as to extend circumferentially thereof has a surface flatness not greater than 200 μm and, preferably, not greater than 100 μm. If the surface flatness of the disc is not smaller than 200 μm, the gap (air gap) between the magnetic sensor 15 and the disc surface will vary in size during rotation of the magnetic encoder 10, resulting in degradation of the sensing accuracy.

By the reason similar to that discussed above, the surface wobbling of the magnetic powder blended and sintered magnet member, which would otherwise occur during rotation of the magnetic encoder 10, is preferably not greater than 200 μm and, more preferably, not greater than 100 μm.

Hereinafter, experiments conducted and results thereof will now be described. Eight magnetic encoders 10 for use in the wheel support bearing assembly according to the first embodiment of the present invention were each prepared by securing to the first sealing plate 11 the sintered element, 54 mm in diameter×66 mm in diameter×1.5 mm in thickness), containing 55 vol. % of a powder of tin as the powdery non-magnetic metallic material and 45 vol. % of a powder of samarium iron as the powdery magnetic material. The resultant magnetic encoders 10 of the same size were press-fitted on to the respective inner members 1 of varying outer diameters that were chosen to provide the different interference amount H as shown in respective Examples 1 to 8 listed in Table 1 below. The presence or absence of damage to the sintered elements in those Examples 1 to 8 is also shown in Table 1. It is to be noted that in those Examples, the sintered elements have not yet been magnetized. The number of samples of the sintered elements examined for each of those Examples 1 to 8 were eight.

TABLE 1

| No. of Examples | Interference Amount (μm) | Deformation of Sealing Plate 11 | Sealability |
|---|---|---|---|
| 1 | 5 | Not found in all samples | Satisfactory |
| 2 | 50 | Not found in all samples | Satisfactory |
| 3 | 100 | Not found in all samples | Satisfactory |
| 4 | 120 | Not found in all samples | Satisfactory |
| 5 | 150 | Not found in all samples | Satisfactory |
| 6 | 180 | Not found in all samples | Satisfactory |
| 7 | 200 | Not found in all samples | Satisfactory |
| 8 | 230 | Not found in all samples | Satisfactory |

As Table 1 makes it clear, in each of Examples 1 to 8 in which the interference amount H ranges from 5 to 230 μm, no deformation was found in the first sealing plate 11 of each of the magnetic encoders 10 and the sealability was found satisfactory in each of those Examples 1 to 8 as well. It is added that although not shown in Table 1 above, no damage to the sintered element was found in each of those Examples 1 to 8.

Table 2 below illustrates comparative Examples 9 to 11 in which the interference amount H departing from the range utilized in the present invention were employed. As is the case with Examples 1 to 8, three magnetic encoders for use in the wheel support bearing assembly were each prepared by securing to the first sealing plate 11 the sintered element, 54 mm in diameter×66 mm in diameter×1.5 mm in thickness), containing 55 vol. % of a powder of tin as the powdery non-magnetic metallic material and 45 vol. % of a powder of samarium iron as the powdery magnetic material. The resultant magnetic encoders of the same size were press-fitted on the respective inner members 1 of varying outer diameters that were chosen to provide the different interference amount H as shown in respective Comparative Examples 9 to 11 listed in Table 2 below. The presence or absence of damage to the sintered elements in those Comparative Examples 9 to 11 is also shown in Table 2. The number of samples of the sintered elements examined for each of those Comparative Examples 9 to 11 were similarly five.

TABLE 2

| No. of Comp. Examples | Interference Amount (μm) | Deformation in Sealing Plate 11 | Sealability |
|---|---|---|---|
| 9 | 3 | Not found | Unsatisfactory |
| 10 | 240 | Found in 2 samples | Unsatisfactory |
| 11 | 280 | Found in 2 samples | Unsatisfactory |

As Table 2 makes it clear, selection of the interference amount H smaller than 3 μm (Comparative Example 9) resulted in insufficient sealability even though no deformation was found in the first sealing plate serving as the core metal. On the other hand, selection of the interference amount H of 240 μm and 260 μm (Comparative Examples 10 and 11, respectively), both of which are greater than the uppermost limit of the interference amount H employed in the practice of the present invention, resulted in that deformation was found in two samples out of the five samples with insufficient sealability.

From Tables 1 and 2 discussed above, it is clear that the interference amount H appears to be within the range of 5 to 230 μm.

FIGS. 8 to 13 illustrates various modifications of the magnetic encoder 10 according to the present invention. Fixing of the multi-pole magnet member 14 of the magnetic encoder 10 to the first sealing plate 11 may be carried out in a manner shown in FIGS. 8 and 9. The first sealing plate 11 shown in FIG. 8 (sectional view) and FIG. 9 (front view) is similar in structure to that shown in and described with reference to FIG. 2 and is therefore of a generally L-sectioned annular configuration including an axially extending cylindrical wall 11a and a radial upright wall 11b protruding radially outwardly from one end of the axial cylindrical wall 11a adjacent the magnetic sensor 15. The radial upright wall 11b has an outer peripheral edge formed integrally with a cylindrical crimping flange 11c protruding generally in a direction counter to the axial cylindrical wall 11a. When the presence of the cylindrical crimping flange 11c is taken into consideration, the first sealing plate 11 as a whole can be considered having a generally Z-sectioned annular configuration.

Figure 8:
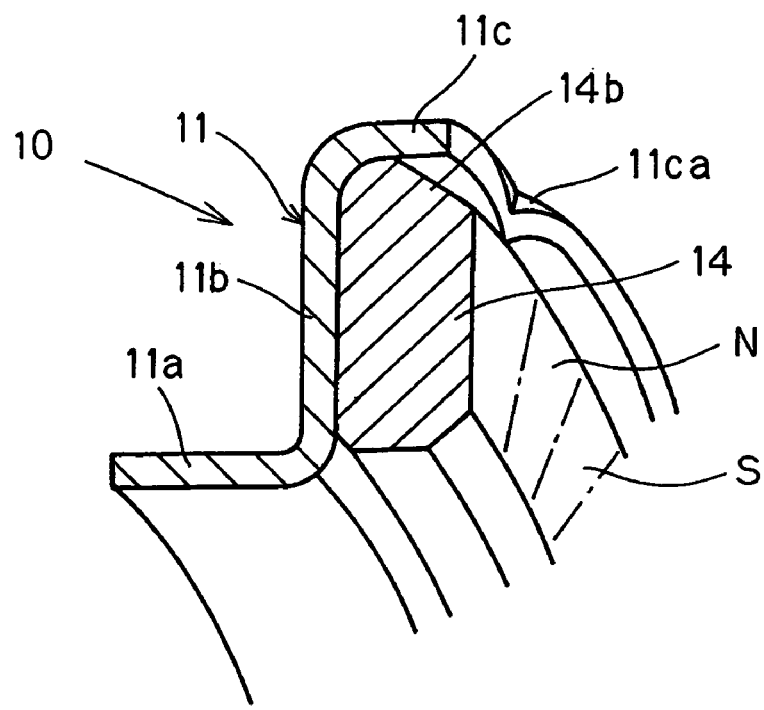
FIG. 8 is a fragmentary perspective view showing a further modified form of the magnetic encoder employed in the wheel support bearing assembly.
Figure 9:
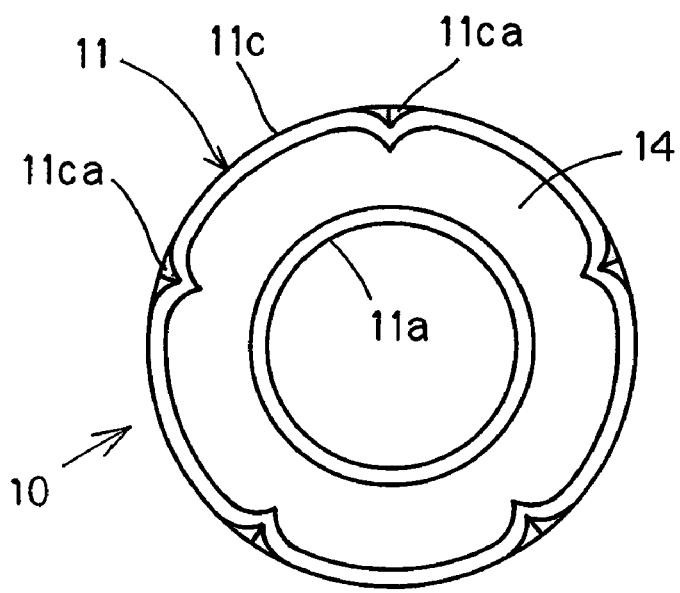
FIG. 9 is a front elevational view of the further modified form of the magnetic encoder shown in FIG. 8.

However, in the modification shown in FIGS. 8 and 9, a plurality of circumferential portions of an axial free end of the cylindrical crimping flange 11c remote from the radial upright wall 11b are, after the multi-pole magnet member 14 has been fitted to the annular surface of the radial upright wall 11c of the first sealing plate 11, plastically deformed generally radially inwardly as at 11ca by means of a staking technique to discretely fix the multi-pole magnet member 14 to the radial upright wall 11b of the core metal 11. Even in this modification, the outer peripheral portion of the multi-pole magnet member 14, that is discretely clamped by the plastically deformed portions 11ca of the cylindrical crimping flange 11c, is depressed as at 14b so that the plastically deformed portions 11ca of the crimpling flange 11c will not protrude inwardly beyond the plane of that surface of the multi-pole magnet member 14 opposite to the radial upright wall 11b and confronting the magnetic sensor 15. It is to be noted that the circumferential depression 14b may be represented by a beveled face 14b that is inclined downwardly from the outermost periphery of the multi-pole magnet member 14 towards the surface thereof confronting the magnetic sensor 15.

In the cases shown in FIGS. 2 and 8, the radial upright wall 11b of the first sealing plate 11 may be of a shape having radially inner and outer annular portions 11ba and 11bb that are axially offset relative to each other as best shown in FIG. 10. In such case, although not shown, the multi-pole magnet member 14 is bonded to one of the opposite surfaces of the radial upright wall 11b that is oriented in a direction conforming to the direction of extension of the cylindrical crimping flange 11c.

Figure 11A:
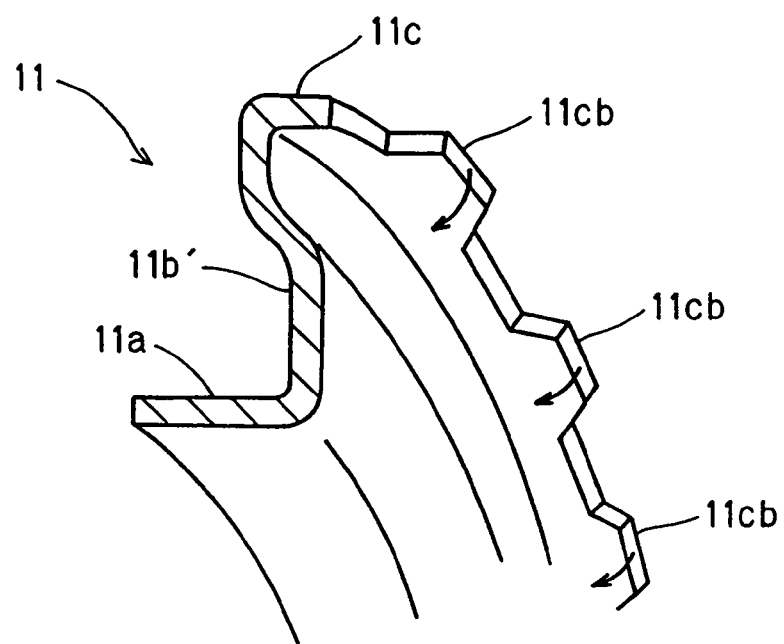
FIG. 11A is a fragmentary perspective view of a first sealing plate forming a part of the magnetic encoder of a further modified form.
Figure 11B:
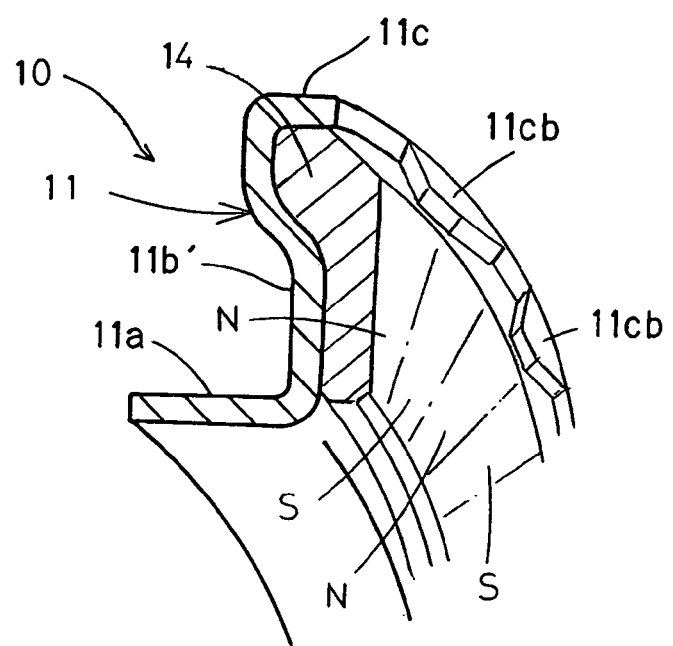
FIG. 11B is a fragmentary perspective view of the first sealing plate of FIG. 11A shown together with the multi-pole magnet member fitted thereto.

Also, as shown in FIGS. 11A and 11B, in the first sealing plate 11 so shaped to represent the generally Z-sectioned configuration, the axial free end of the cylindrical crimping flange 11c remote from the radial upright wall 11b is formed integrally with a plurality of tongues 11cb spaced preferably an equal distance from each other in a direction circumferentially thereof. Those tongues 11bc are, after the multi-pole magnet member 14 has been fitted to the annular surface of the radial upright wall 11c of the first sealing plate 11, individually deformed or crimped radially inwardly, as shown by the arrows in FIG. 11A, to fix the multi-pole magnet member 14 to the core metal 11, as best shown in FIG. 11B. As is the case with the example shown in and described with reference to FIG. 2, the multi-pole magnet member 14 is bonded to one of the opposite surfaces of the radial upright wall 11b that is oriented in a direction conforming to the direction of extension of the cylindrical crimping flange 11c.

Even in the modification shown in and described with reference to FIGS. 11A and 11B, the radial upright wall 11b' of the first sealing plate 11 is so shaped as to have radially inner and outer annular portions 11ba and 11bb that are axially offset relative to each other as is the case with the modification shown in FIG. 10. Where the axially stepped radial upright wall 11b' is employed such as shown in FIGS. 10 and FIGS. 11A and 11B, one of the opposite annular surfaces of the multi-pole magnet member 14 that is bonded to the radial upright wall 11b' of the first sealing plate 11 may be correspondingly stepped to follow the contour of the axially stepped radial upright wall 11b'.

Figure 12:
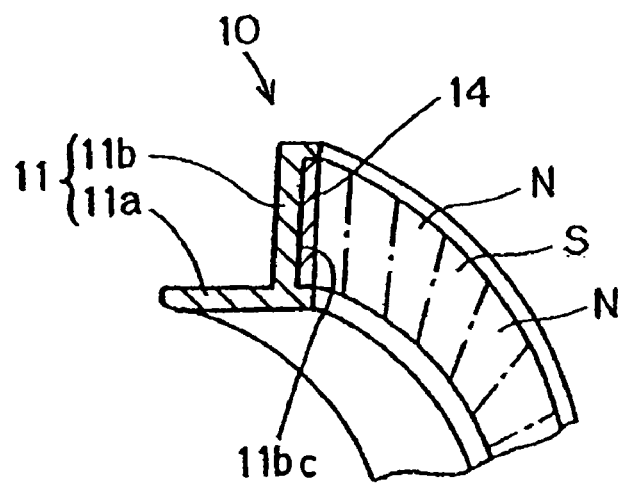
FIG. 12 is a fragmentary perspective view of a first sealing plate forming a part of the magnetic encoder of a still further modified form.

In describing the foregoing preferred embodiment of the present invention including the modifications thereof, the first sealing plate 11 has been described as prepared from the steel plate by the use of any known press work. However, as shown in FIG. 12, the first sealing plate 11 may be prepared from a steel plate by the use of any known grinding technique, i.e., by grinding a steel casting to a required shape. In such case, one of the opposite annular surfaces of the radial upright wall 11b of the first sealing plate 11 confronting the magnetic sensor 15 may be ground to form an annular depression 11bc in which the annular multi-pole magnet member 14 can be nested.

Figure 13:
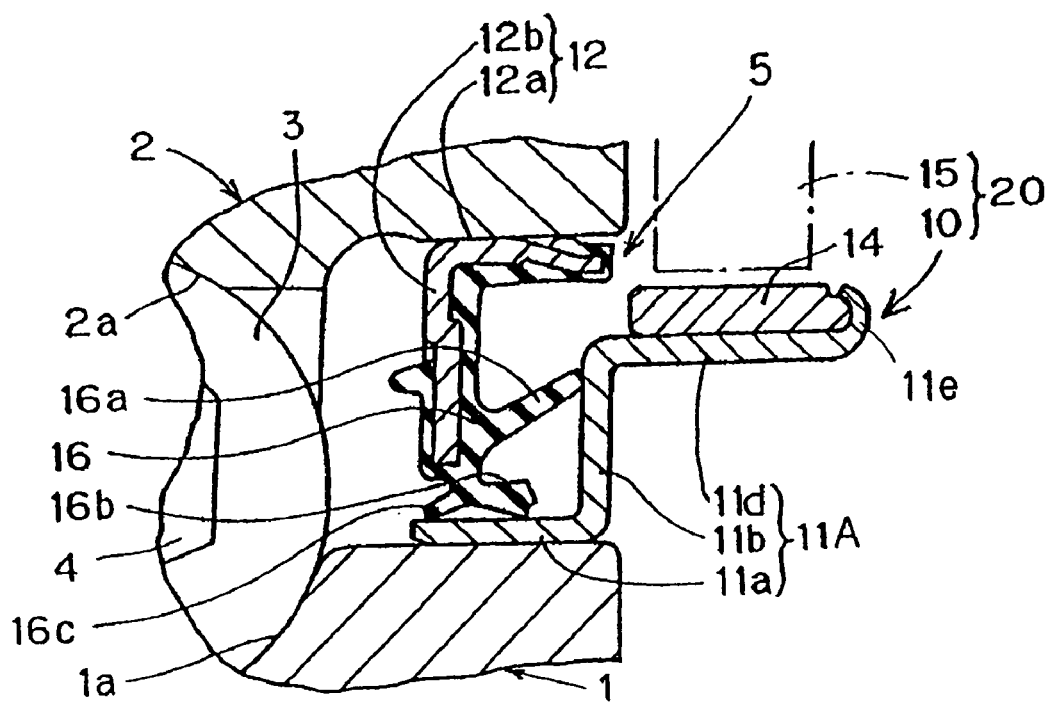
FIG. 13 is a sectional view showing the magnetic encoder employed in the wheel support bearing assembly according to a further embodiment of the present invention.

In the foregoing embodiment of the present invention, the magnetic encoder 10 has been described as having the multi-pole magnet member 14 with its to-be-detected surface oriented axially to confront with the magnetic sensor 15. However, as shown in FIG. 13, the multi-pole magnet member 14 may have its to-be-detected surface oriented radially outwardly, in which case the magnetic sensor 15 should be so positioned as to face the to-be-detected surface of such multi-pole magnet member 14. According to the modification shown in FIG. 13, the first sealing plate 11A which serves as a slinger of the sealing unit 5 is formed integrally with a second axial cylindrical wall 11d extending axially outwardly from an outer peripheral edge of the radial upright wall 11b, with the multi-pole magnet member 14 fixedly mounted on an outer peripheral surface of the second axial cylindrical wall 11d. A cylindrical crimping flange 11e similar in function to the cylindrical crimping flange 11c shown in, for example, FIGS. 2A and 2B is similarly formed integrally with an axial free end of the second axial cylindrical wall 11d so as to extend generally radially outwardly, so that when this cylindrical crimping flange 11e is crimped, the multi-pole magnet member 14 can be fixed to the second axial cylindrical wall 11d of the first sealing plate 11A. As a matter of course, the radial upright wall 11b of the first sealing plate 11A extends radially outwardly from the axial cylindrical wall 11a of the same first sealing plate 11A.

It is to be noted that even in the foregoing modifications of the present invention as shown in FIGS. 8 to 13, respectively, when the sealing plate 11 or 11A is press-fitted on the inner member 1, the interference amount H between the first sealing plate 11 or 11A and the inner member 1 is chosen to be within the range of 5 to 230 μm to thereby secure the satisfactory sealability and also to permit the magnetic encoder 10 to be firmly press-fitted onto the first member 1.

It is also to be noted that where the magnetic encoder 10 is employed as a component part of the sealing unit 5, the multi-pole magnet member 14 may be so positioned that the to-be-detected surface thereof is oriented axially inwardly, i.e., in an axial direction counter to that described hereinbefore. In other words, the multi-pole magnet member 14 may be mounted on one of the opposite annular surfaces of the first sealing plate 11 that is oriented axially inwardly of the bearing assembly. In such case, the first sealing plate 11 is preferably prepared from a non-magnetic metallic plate such as a non-magnetic steel plate.

Also, in the foregoing embodiment of the present invention, the multi-pole magnet member 14 of the magnetic encoder 10 has been shown and described as prepared from the sintered element. However, in a broad aspect of the present invention, the multi-pole magnet member 14 may be in the form of a rubber magnet member made of an elastomer mixed with a powdery magnetic material, or a plastics magnet member made of a plastomer mixed with a powdery magnetic material.

The wheel support bearing assembly of the structure hereinbefore is particularly suited to support a vehicle drive wheel. However, as will be described with particular reference to FIG. 14, the present invention can be equally applied to a similar wheel support bearing assembly suited to support a vehicle driven wheel.

Figure 14:
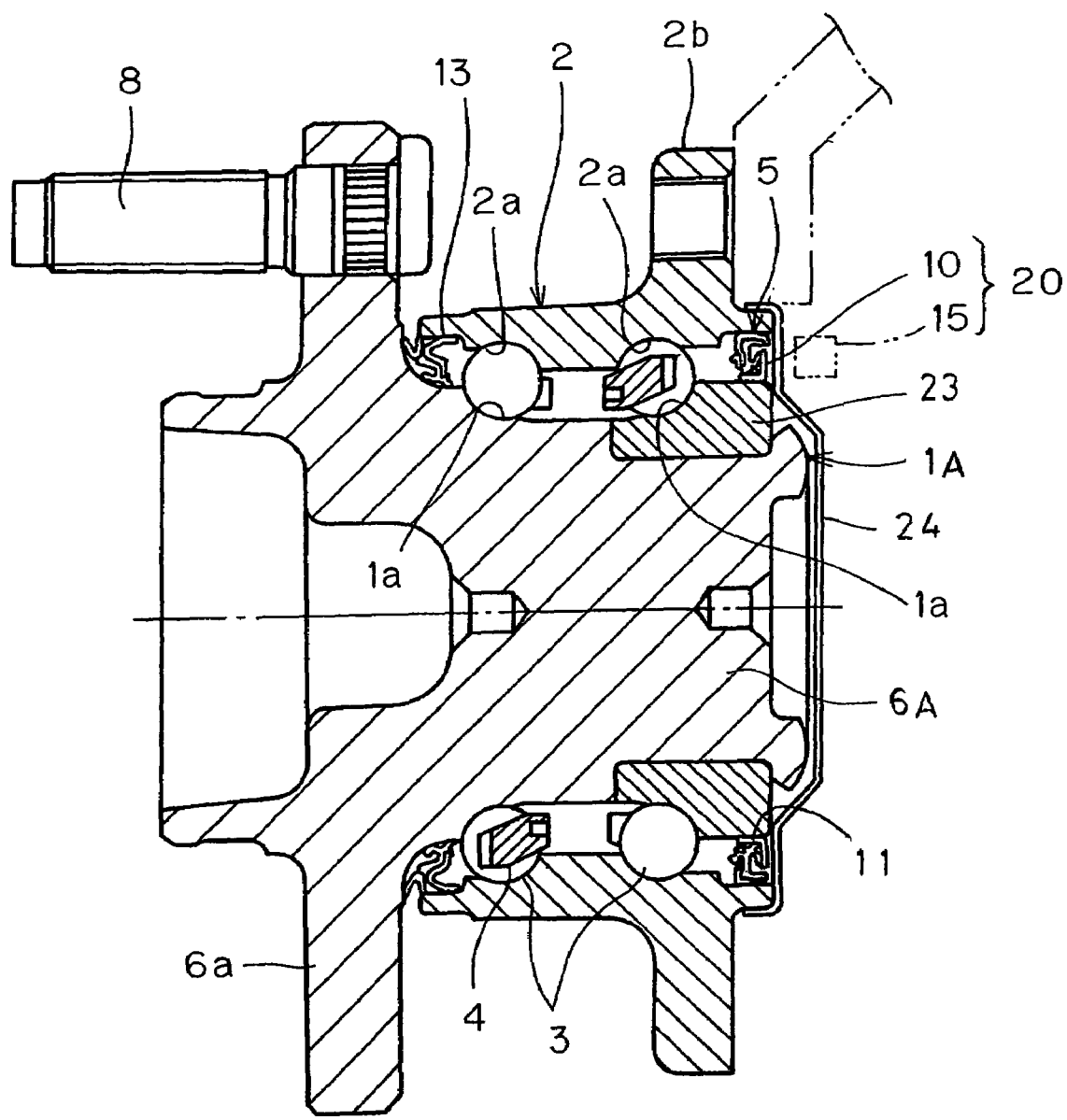
FIG. 14 is a longitudinal sectional view of the wheel support bearing assembly according to a still further preferred embodiment of the present invention.

Referring now to the embodiment shown in FIG. 14, the outer member 2 is provided with a generally disc-shaped cover 24 for enclosing the inboard of the bearing assembly. The wheel support bearing assembly shown therein is of a third generation type, in which the inner member 1A is comprised of a hub wheel 6A and a single inner race segment 23 fixedly mounted on the hub wheel 6A. The magnetic encoder 10 employed therein is substantially identical with that shown in and described with reference to FIGS. 1 to 8 and, as such, the interference amount H between the first sealing plate 11 and the inner member 1A, particularly the single inner race segment 23, is chosen to be within the range of 5 to 230 for press-fitting the first sealing plate 11 onto the inner member 1A.

In describing the foregoing embodiments of the present invention, reference has been made to the wheel support bearing assemblies of the first and third generation type, but the present invention is equally applicable to any wheel support bearing assembly regardless of the generation type. In addition, the wheel support bearing assembly to which the present invention is applicable may be of either an inner race rotating type or an outer race rotating type and/or of a type suitable for the support of either the vehicle drive wheel or the vehicle driven wheel.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly for rotatably supporting a vehicle wheel relative to a vehicle body structure, said wheel support bearing assembly comprising:

an outer member having an inner peripheral surface formed with a plurality of first raceways;

an inner member having a corresponding number of second raceways defined therein in alignment with the first raceways in the outer member, said inner member being positioned inside the outer member with an annular bearing space delimited between the inner member and the outer member;

rows of rolling elements rollingly received in part within the first raceways and in part within the second raceways;

at least one sealing unit to seal one of opposite open ends of the annular bearing space, said at least one sealing unit including a first sealing plate of a generally L-sectioned configuration, having a first axial cylindrical wall mounted on one of the outer and inner members which serves as a rotatable member and a first radial upright wall extending radially from the first axial cylindrical wall, and also including a second sealing plate of a generally L-sectioned configuration positioned in face-to-face relation with the first sealing plate and mounted on the other of the outer and inner members which serves as a stationary member, said second sealing plate having a second axial cylindrical wall and a second radial upright wall protruding radially from the second axial cylindrical wall;

an elastic sealing member, secured to the second sealing plate, including a side sealing lip slidingly engaging the first radial upright wall of the first sealing plate and at least one radial sealing lip slidingly engaging the first axial cylindrical wall of the first sealing plate; and a magnetic encoder including a multi-pole magnet member fixedly mounted on the first radial upright wall of the first sealing plate, said first sealing plate cooperating with the multi-pole magnet member to define the magnetic encoder, said first sealing plate being mounted on the rotating member under an interference fit with the amount of interference fit within the range of 5 to 230 μm.

wherein the multi-pole magnet member of the magnetic encoder is a sintered element prepared by sintering a mixture of a powdery magnetic material and a powdery non-magnetic material, the amount of the powdery non-magnetic metallic material being within the range of 1 to 90 vol. % relative to the total volume of the multi-pole magnet member, and each of the powdery magnetic material and the powdery non-magnetic material has an average particle size within the range of 10 to 230 µm.

2. The wheel support bearing assembly as claimed in claim 1, wherein the first radial upright wall of the first sealing plate of the magnetic encoder includes an annular inner portion and an annular outer portion continued from and offset axially from the annular inner portion.

3. The wheel support bearing assembly as claimed in claim 1, wherein at least one of the multi-pole magnet member of the magnetic encoder and one of opposite surfaces of the first sealing plate where the multi-pole magnet member is fixedly mounted is treated for rust-proofing.

4. The wheel support bearing assembly as claimed in claim 3, wherein the rust-proofing treatment is carried out to form a rust-proofed coating with a highly anti-corrosive clear paint.

5. The wheel support bearing assembly as claimed in claim 1, wherein the first radial upright wall of the first sealing plate is formed with a second axial cylindrical wall and wherein the multi-pole magnet member is mounted on an outer peripheral surface of the second axial cylindrical wall instead of being mounted on the first radial upright wall.

6. The wheel support bearing assembly as claimed in claim 1, wherein the amount of the powdery non-magnetic metallic material is within the range of 5 to 85 vol. % relative to the total volume of the multi-pole magnet member.

7. The wheel support bearing assembly as claimed in claim 1, wherein the amount of the powdery non-magnetic metallic material is within the range of 10 to 80 vol. % relative to the total volume of the multi-pole magnet member.

* * * * *

UNITED STATES PATENT AND TRADEMARK OFFICE
CERTIFICATE OF CORRECTION

PATENT NO.         : 7,207,723 B2
APPLICATION NO. : 10/793875
DATED                : April 24, 2007
INVENTOR(S)       : Tatsuo Nakajima et al.

It is certified that error appears in the above-identified patent and that said Letters Patent is hereby corrected as shown below:

Column 20, Line 61, change "230 µm." to --230 µm,--.

Signed and Sealed this

Eighth Day of April, 2008

JON W. DUDAS
*Director of the United States Patent and Trademark Office*